March 25, 1930.   C. J. MERZ   1,751,873
TIRE BUILDING TOOL
Filed Feb. 1, 1929
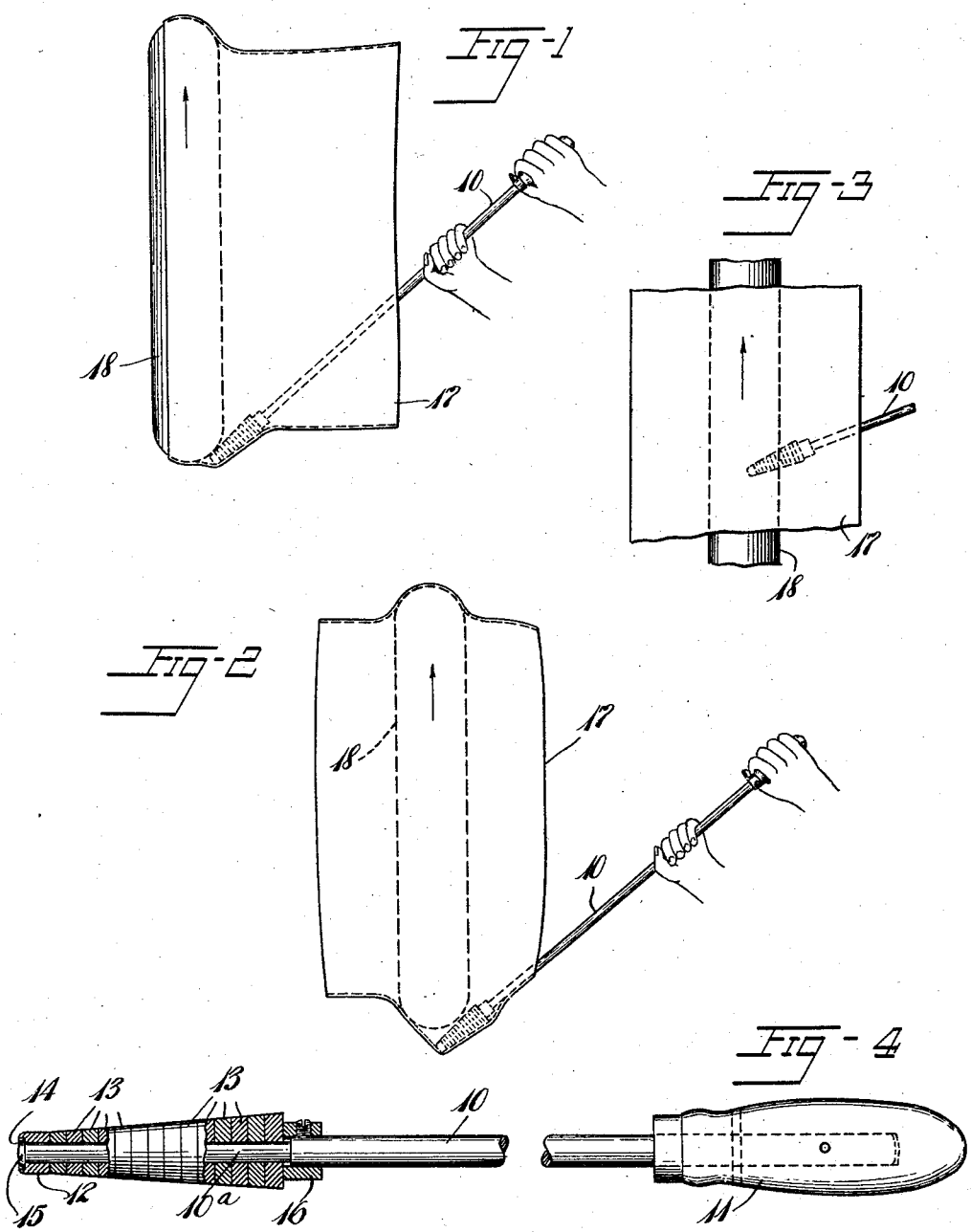
Inventor
Christian J. Merz
By Eakin & Avery
Attys- Patented Mar. 25, 1930

1,751,873

UNITED STATES PATENT OFFICE

CHRISTIAN J. MERZ, OF AKRON, OHIO, ASSIGNOR TO THE B. F. GOODRICH COMPANY, OF NEW YORK, N. Y., A CORPORATION OF NEW YORK

TIRE-BUILDING TOOL

Application filed February 1, 1929. Serial No. 336,790.

This invention relates to tire-building tools, and more especially to a tool for mounting an endless band of tire-building material centrally upon the tire core of a tire-building machine during the manufacture of a pneumatic tire casing thereon.

The invention is an improvement upon the cylindrical non-rotatable rod or hand bar which heretofore commonly has been used for the same purpose, though in a different manner. Such rods frequently cause chafing of the tire building material and rub the rubber coating therefrom, and they require considerable manual effort to manipulate them due to their friction against the material.

The chief objects of this invention are to provide an improved tire building tool for the purpose mentioned, and especially one adapted to operate upon the tire building material without excessive friction. A further object is to provide a tool which, because of its particular construction, will effect a lateral feeding of a tire band onto a tire core. Other objects will be manifest as the specification proceeds.

Of the accompanying drawings:

Fig. 1 is a front elevation of a tire core and an endless band of tire building material, and my improved tire building tool associated therewith at the initial stage of mounting the band upon the core.

Fig. 2 is a view similar to Fig. 1 at the final stage of the band-applying operation.

Figure 3 is a plan view of the elements shown in Fig. 2.

Figure 4 is a side elevation of my improved tire building tool, on a larger scale, a part being broken away and a part being in section.

Referring to Fig. 4 of the drawings, the tire building tool comprises a rigid rod or hand bar 10 upon one end of which is fixedly mounted a handle 11. The opposite end of the hand bar 10 is formed with a portion 10ª of reduced diameter upon which is journaled a cylindrical nose-piece 12 at the end thereof, and a plurality of substantially laterally abutting discs 13, 13, the outer end-face of the nose-piece 12 being formed with a counter-bore 14 to accommodate the peened-over end 15 of the bar 10. An adjustable collar 16 mounted upon the latter is provided for holding the nose-piece 12 and the discs 13 in properly assembled relation, loose enough to permit relative rotary movement between the respective discs, and between the nose-piece and its adjacent disc.

Preferably the nose-piece 12 is composed of metal for strength, and the discs 13 are composed of fibre or similar material, so that they may rotate freely upon their journal and slide against each other without the use of a lubricant, since to lubricate the discs would incur the possibility of the tire band being damaged by some of the lubricant. The nose-piece is as small as is consistently possible for the strength required, and the discs 13 preferably are frusto-conical in shape and in their assembled form comprise a sectional structure which tapers toward said nose-piece.

In the operation of the tool, an annular band of tire fabric, such as the band 17, Figs. 1, 2 and 3, is started upon a rotatable tire core, such as the core 18, one of the lateral margins of the band being stretched onto the crown of the core throughout at least a part of its circumference. The tire core is then caused to rotate, and the centrifugal force thereby imparted to the band 17 causes the latter to assume the generally cylindrical shape shown in Fig. 1.

The tire-building tool is then thrust between the tire core 18 and tire band 17 as shown in Fig. 1 and urged outwardly and forwardly against the tire band until it reaches the position shown in Fig. 2, with the tapered discs 13 disposed clear of the core. The tool also is held at a slight angle to the core, as is clearly shown in Fig. 3, with the nose of the tool pointed in the direction from which the fabric approaches as the core rotates. Used in this manner the tool feeds the fabric 17 axially toward the core 18 and over the crown thereof. When the band attains the position centrally of the core, shown in Figs. 2 and 3, the tool is withdrawn and subsequent operations may be performed upon the band.

Apparently the feeding of the band 17 in an axial direction is the result primarily of the angle at which the tool is presented to the band as shown in Fig. 3, and the consequent oblique direction of travel of the parts of the disc in contact with the tire band, and this factor, possibly assisted by a crown-pulley effect incident to the angle of the tool, which is shown in Fig. 2, is great enough to prevent the tensioned band from sliding in the opposite direction upon the inclined tool.

The distance from the axis of the band to the nose of the tool is greater than the radial distance to the opposite end of its work-engaging portion, as is clearly shown in Figs. 1 and 2, with the result that the surface speed of the band is greatest where it passes over the nose of the tool. Since the nose-piece 12 and the respective discs 13 are journaled for rotation with relation to each other, each may be driven at the speed of that portion of the work which engages it, and there is no such frictional drag or urge upon the band by different regions of the tool as would result from the use of a rotatable tool having a single rotary member of appropriate length. Moreover, in the event that the operator inadvertently allows the tool to come into contact with the rotating core during the application of a band thereto, the slowing down or stopping of the rotation of the tool resulting therefrom is confined to one or two discs only, so that there is but little retarding effect or drag on the band in contact with other portions of the tool.

Undersirable chafing of the band, such as occurs when a tool comprising a non-rotatable bar is used, also is avoided by the use of my rotatable tool, and the task of the operator is rendered less laborious by the absence of sliding friction of the band upon the tool.

The relatively small nose-portion of the tool permits it easily to be inserted between the core and tire-band, and the relatively larger diameter of the other end of the work-engaging portion of the tool permits the band to pass thereover without such sharp flexure as might strain the fabric.

Although I have described the operation of my improved tool with reference to the application of the first tire band to be mounted upon a tire core, its applicability is not limited thereto and it may be used with equal advantage upon succeeding tire bands mounted upon the same core.

My invention is susceptible of modification within the scope of the appended claims.

I claim:

1. A tire-building tool comprising a hand bar and a sectional, tapered roller journaled on one end portion thereof.

2. A tire-building tool comprising a hand bar and a tapered roller journaled on one end portion thereof.

3. A tire-building tool comprising a hand bar and a roller journaled co-axially thereof on one of the extremities thereof.

4. A tire-building tool comprising a hand bar and a tapered roller journaled thereon at one of the extremities thereof.

5. A tire-building tool comprising a hand bar and a sectional roller journaled co-axially thereof on one of the extremities thereof.

6. A tire-building tool comprising a hand bar and a sectional, tapered roller journaled thereon at one of the extremities thereof.

7. A tire-building tool comprising a bar and a sectional, tapered roller journaled thereon.

In witness whereof I have hereunto set my hand this 29th day of January, 1929.

CHRISTIAN J. MERZ.